United States Patent
Hoekstra et al.

(10) Patent No.: US 10,010,867 B2
(45) Date of Patent: Jul. 3, 2018

(54) PROCESS FOR PRODUCING CARBON NANOFIBERS AND/OR CARBON NANOTUBES

(71) Applicant: BASF Corporation, Florham Park, NJ (US)

(72) Inventors: Jacobus Hoekstra, De Meern (NL); John Wilhelm Geus, Bilthoven (NL); Leonardus Wijnand Jenneskens, Soest (NL)

(73) Assignee: BASF CORPORATION, Florham Park, NJ (US)

( * ) Notice: Subject to any disclaimer, the term of this patent is extended or adjusted under 35 U.S.C. 154(b) by 373 days.

(21) Appl. No.: 14/485,642

(22) Filed: Sep. 12, 2014

(65) Prior Publication Data

US 2015/0018201 A1 Jan. 15, 2015

Related U.S. Application Data

(63) Continuation of application No. 13/203,581, filed as application No. PCT/NL2010/050100 on Mar. 1, 2010, now abandoned.

(30) Foreign Application Priority Data

Feb. 27, 2009 (EP) .................................... 09153958

(51) Int. Cl.
   *B01J 21/18* (2006.01)
   *C10G 27/00* (2006.01)
   (Continued)

(52) U.S. Cl.
   CPC ............. *B01J 21/185* (2013.01); *B01J 23/40* (2013.01); *B01J 23/70* (2013.01); *B01J 27/20* (2013.01);
   (Continued)

(58) Field of Classification Search
   None
   See application file for complete search history.

(56) References Cited

U.S. PATENT DOCUMENTS

| | | |
|---|---|---|
| 3,400,181 A | 9/1968 | Battista et al. |
| 4,500,504 A * | 2/1985 | Yamamoto ............ C30B 25/005 117/75 |

(Continued)

FOREIGN PATENT DOCUMENTS

| | | |
|---|---|---|
| EP | 1589131 | 10/2005 |
| GB | 1 132 782 | 11/1968 |

(Continued)

OTHER PUBLICATIONS

Su et al.; Hierarchically Structure Carbon: Synthesis of Carbon Nanofibers Nested inside or Immobilized onto Modified Activated Carbon; Angew. Chem. Int. Ed. 44, 5488-5492; 2005.*

(Continued)

*Primary Examiner* — Guinever S Gregorio
(74) *Attorney, Agent, or Firm* — Lowenstein Sandler LLP

(57) ABSTRACT

The invention is directed to a process for producing carbon nanofibers and/or carbon nanotubes, which process comprises pyrolyzing a particulate cellulosic and/or carbohydrate substrate that has been impregnated with a compound of an element or elements, the metal or alloy, respectively, of which is capable of forming carbides, in a substantially oxygen free, volatile silicon compound containing atmosphere, optionally in the presence of a carbon compound.

12 Claims, 1 Drawing Sheet

(51) Int. Cl.
*C10G 49/06* (2006.01)
*C10G 49/02* (2006.01)
*D01F 9/127* (2006.01)
*D01F 9/16* (2006.01)
*B01J 23/40* (2006.01)
*B01J 23/70* (2006.01)
*B01J 27/20* (2006.01)
*C01B 32/16* (2017.01)
*B01J 37/08* (2006.01)
*B01J 37/02* (2006.01)
*B01J 23/16* (2006.01)
*B01J 23/745* (2006.01)
*B01J 23/755* (2006.01)
*B01J 35/06* (2006.01)
*C01B 32/907* (2017.01)

(52) U.S. Cl.
CPC .............. *C01B 32/16* (2017.08); *C10G 27/00* (2013.01); *C10G 49/02* (2013.01); *C10G 49/06* (2013.01); *D01F 9/127* (2013.01); *D01F 9/16* (2013.01); *B01J 23/16* (2013.01); *B01J 23/745* (2013.01); *B01J 23/755* (2013.01); *B01J 35/06* (2013.01); *B01J 37/0203* (2013.01); *B01J 37/0219* (2013.01); *B01J 37/0238* (2013.01); *B01J 37/084* (2013.01); *C01B 32/907* (2017.08)

(56) References Cited

U.S. PATENT DOCUMENTS

| | | |
|---|---|---|
| 2002/0064495 A1 | 5/2002 | Miura et al. |
| 2004/0160157 A1 | 8/2004 | Takikawa et al. |
| 2007/0129481 A1 | 6/2007 | Yamaguchi et al. |
| 2009/0176646 A1* | 7/2009 | Kim ........................ B01J 21/185 502/172 |
| 2010/0205858 A1 | 8/2010 | O'Connor |
| 2011/0171096 A1* | 7/2011 | Li ........................... C01B 31/30 423/291 |

FOREIGN PATENT DOCUMENTS

| | | |
|---|---|---|
| GB | 1 398 417 | 6/1975 |
| JP | H0283209 | 3/1990 |
| JP | H02307818 | 12/1990 |
| JP | 2001122608 | 5/2001 |
| JP | 2002161278 | 4/2002 |
| JP | 2005126292 | 5/2005 |
| JP | 2007070166 | 3/2007 |
| JP | 2007290949 | 11/2007 |
| JP | 2008185495 | 8/2008 |
| JP | 2009067674 | 4/2009 |
| KR | 2007047955 A | 5/2007 |
| WO | 2008006902 A2 | 1/2008 |
| WO | 2007131795 | 4/2008 |

OTHER PUBLICATIONS

Cui et al, "Structural Effects of Iron Oxide Nanoparticles and Iron Ions on the Hydrothermal Carbonization of Starch and Rice Carbohydrates", Small, 2006, 756-759.

* cited by examiner

PROCESS FOR PRODUCING CARBON NANOFIBERS AND/OR CARBON NANOTUBES

CROSS REFERENCE TO RELATED APPLICATIONS

This application is a continuation of U.S. Ser. No. 13/203,581 and claims priority from PCT/NL2010/050100 having a priority date of Feb. 27, 2009 based on EP 09153958.5, all of which are incorporated herein by reference in their entirety.

Carbon nanofibers (CNF), carbon nanotubes (CNT) and composites containing them (hereinafter jointly referred to as CNF), have gained increasing attention in the last few years due to their high strength, chemical purity and chemical inertness which features make them ideally suitable for use as a catalyst support.

The relevance of CNF materials is clearly envisioned by their application as a support in various catalytic processes, such as Fischer-Tropsch and selective hydrogenations. The catalytic performance of the carbon (graphite, activated carbon) supported catalysts can be tuned by a change of the features of the support, like the amount of oxygen-containing surface groups, the accessibility of the support, and the degree of carbon ordering. A similar influence of the support exists on the performance of a metal/CNF catalyst.

A number of important pre-requisites have to be fulfilled for a good catalyst support material, such as a high bulk density, a high strength and a high porosity. High support densities result in a more efficient use of the reactor volume and are therefore economically favorable above low density supports. On the other hand, the porosity i.e., accessibility is important in order to avoid mass transport limitations.

The properties of CNF potentially surpass those of conventional oxidic supports like a.o., silica and alumina. Carbon nanofibers are chemically inert, pure and mechanically strong and thus suitable as catalytic support material. The CNF-bodies consist of entangled individual carbon nanofibers, which are formed during the catalytic growth via decomposition of carbon containing gases, such as $CO/H_2$, $CH_4$, $C_2H_4$, or other volatile compounds such as toluene and the like over growth catalysts based on metals, such as those based on nickel, cobalt, iron, ruthenium, combinations and/or alloys thereof and the like. Suitable supports are silica, alumina, magnesia, carbon, carbon fibers and the like.

The two most encountered forms of CNF are the fishbone and the parallel type (also called multiwalled carbon nanotubes). In the fishbone type fibers the graphite planes are oriented at an angle to the central axis, thus exposing graphite edge sites. If the graphite planes are oriented parallel to the central axis, like in the parallel type of CNF, only basal graphitic planes are exposed.

It has been proposed to manufacture such catalyst carriers from carbon nanofibers or nanotubes. In WO 93/24214 it is proposed to use carbon nanofibers or nanotubes as catalyst carriers in which the graphitic layers are oriented essentially in parallel to the filament axis. The use of such relatively long and straight carbon filaments as bodies with controllable dimensions is difficult. Indeed, for catalysts the dimensions and porosity are of great importance. In fixed catalyst beds the dimensions of the carrier bodies determine the pressure drop and the transport of reactants and reaction products through the catalyst bodies. In the case of liquid suspended catalysts the transport of the reactants and reaction products is of great importance. The dimensions of the catalyst bodies are, as has been stated above, of great importance to the transport, as well as to the separation of the bodies, for example by filtration of centrifugation.

Another drawback is the fact that carbon nanofibers or nanotubes must be grown from metallic particles applied on carriers such as silicon dioxide or aluminium oxide. These carriers can often interfere with the application of the obtained carbon carriers in liquid phase reactions. Removal of the silica or alumina by treatment with alkali or acid, respectively, is difficult.

In WO 2005/103348 it has been proposed to produce CNF materials of very high density, a bulk density of at least 800 $kg/m^3$, This is achieved by growing carbon nanofibers on the surface of a supported carbon fibre producing metal catalyst, such as a nickel, cobalt, iron and ruthenium catalyst, by decomposition of a hydrocarbon, for a sufficient period of time to produce the required bulk density, optionally followed by removal of the growth catalyst.

These CNF materials have not been very successful until now, chiefly because it is very difficult to produce shaped bodies of sufficient strength for application as a catalyst carrier material, or as catalyst.

Accordingly it is a first object of the invention to provide a CNF/CNT material that can suitably processed into a form that is useful for catalytic applications. It is a further object to produce these materials from relatively abundantly occurring natural materials, in some circumstances even without the need for external supply of carbon compounds (often from non-renewable sources).

The present invention is accordingly directed to a process for producing carbon nanofibers and/or carbon nano tubes, which process comprises pyrolysing a particulate cellulosic and/or carbohydrate substrate that has been impregnated with a compound of an element or elements, the metal or alloy, respectively, of which is capable of forming carbides, in a substantially oxygen free, volatile silicon compound containing atmosphere, optionally in the presence of a carbon compound.

Surprisingly it was found that with this process a very interesting and suitable form of CNF materials is obtained, as can be seen in the EM photographs referred to in the Example.

Figure 1:
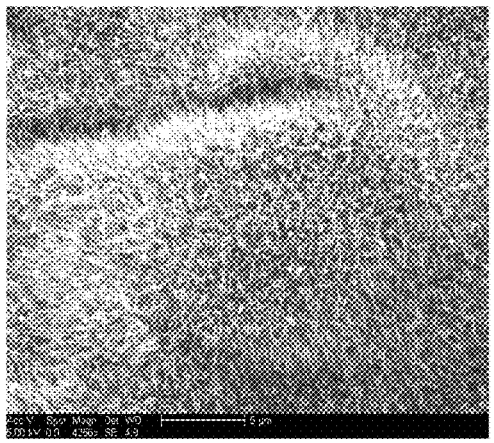
FIG. 1 is an EM photograph of the resulting material of example 1

The process comprises impregnating the substrate with a metal compound or combination of metal compounds, followed by pyrolysing the impregnated substrate. The metal compounds are preferably salts of these metal compounds and more in particular in aqueous solution. The elements (metals) have the property that they are able to form carbides. Examples of suitable elements are nickel, cobalt, iron and molybdenum. Preferred are iron and nickel.

Surprisingly, it was further found that from alternative cellulose and/or carbohydrate containing materials, such as soy meal, sugar, hydroxyl ethyl cellulose, cellulose and derivatives and the like, spheres can be produced that also yield mechanically strong carbon spheres upon thermal decomposition. Considering the fact that soy meal is much cheaper in comparison to the very pure microcrystalline cellulose (MCC), this is an essential advantage. These carbon spheres form the core of the CNF material, which grows during the process on the surface of the spheres.

Another suitable starting material for the production of carbon spheres is sugar, or a mixture of sugar and microcrystalline cellulose or soy meal. According to a preferred procedure we start from carbonaceous bodies produced by a hydrothermal treatment of agriculturally produced materials, such as, sugars, starch, soy meal, (hemi)cellulose, as well as dehydrated products of the above compounds, such as, furfural and 2-hydroxyfurfural. Preferably dehydration of the above compounds is performed as described in Bo Hu, Shu-Hong Yu, Kan Wang, Lei Liu and Xue-Wei Xu Dalton Trans. 2008, 5414-5423 and in references mentioned therein. After impregnation of the hydrothermally treated bodies, the thermal treatment according to the procedure of the present invention is executed. Alternatively a solution of the metal compounds can also be mixed within the water employed in the hydrothermal treatment. During the thermal decomposition of spheres that predominantly or exclusively comprise sugar, care should be taken that during heating the temperature at which the sugar melts is passed by so quickly that the sugar will decompose before the melting process progresses. Dehydration of the sugar before raising the temperature to the decomposition temperature has been found to be effective too. Given the low price of sugar and the other cellulose containing materials, the present invention is of great importance for the technical application of mechanically strong carbon particles.

In general the cellulosic or carbohydrate starting materials will comprise organic materials, generally of renewable sources, that have the property that upon pyrolysis under inert conditions, a gas having reducing properties is obtained.

Surprisingly, it was thus found that carbon nanofibers and/or nanotubes can be grown by heating the iron and/or nickel compound impregnated cellulose and/or carbohydrate containing spheres in the presence of volatile silicon containing compounds, preferably in the absence of an external carbon atom supplying gas under an inert stationary atmosphere. The gases released upon the pyrolysis of the cellulose can make up the carbon supply for the growth of the carbon nanotubes.

Because CNF consist of carbon, a carbon-containing gas is needed for the synthesis of these materials. In a preferred embodiment this gas is generated by the pyrolysis of the carbon spheres, but in an alternative embodiment, additional gas may be supplied from an external source.

The additional carbon containing gas in the production of the CNF can be any suitable carbon containing gas, such as has been used in the art. Examples are CO, $CO/H_2$ mixtures, $CH_4$, $C_2H_4$ and other gases such as the lower alkanes, alcohols, alkylenes, alkyns, aromatic compounds, such as benzene and toluene, and the like. Preferred is the use of methane, toluene or $CO/H_2$. Instead of the highly poisonous CO methanol can be employed. Optionally the gas may be diluted with an inert gas, such as nitrogen.

The pyrolysis occurs in a suitable reactor for producing the CNF, such as a fluid bed reactor, a fixed bed reactor, riser reactor. The temperature in the reactor is kept at a level which is suitable for the pyrolysis and producing the fibers. The temperature is dependent on the nature of the catalyst and the nature of the carbon containing gas. A general lower limit of the temperature is 400° C. For gases such as methane and $CO/H_2$ the temperature is generally between 400° C. and 925° C. A general upper limit for the temperature is 1250° C.

After the CNF-composites have been produced, they may be used as such for various applications, such as polymer additive, hydrogen storage, micro electronics, fixation of homogeneous catalysts or enzymes, more in particular as catalyst support. As no separate supported catalyst has been used, there is no need for removing the (generally oxidic) support, contrary to the prior art processes. According to the present invention the support material of the iron or nickel compound is also pyrolysed and converted into carbon.

After the production of the CNF's it is further possible to modify them, for example to remove the metal even further and/or to introduce oxygen containing groups on the surface of the CNF's, to produce oxidised CNF's. These treatments generally include the use of HCl and/or $H_2SO_4/HNO_3$ (in varying ratio's) or oxidation with a gaseous oxidizing species according to the state-of-the-art.

The invention is also directed to the use of the CNF materials as catalyst or catalyst support. The composites may be used as such for reactions that are catalysed by carbon, optionally having received a surface modification by oxidation. It is, however, preferred to apply a suitable catalytically active material on the surface of the CNF. Suitable catalytically active materials can be the metallic or oxidic base metals, such as nickel, copper, tungsten, iron, manganese, zinc, vanadium, chromium, molybdenum, rhodium, iridium, ruthenium and the like, as well as combinations thereof. It is also possible to use the CNF as support for precious metal catalysts, such as those based on platinum, palladium, gold or silver and combinations thereof. It is also possible to anchor organometallic, or metal-phosphine catalysts on the surface of the CNF.

When preparing a catalyst with CNF as the support it is preferred to use an oxidised CNF, as this improves the dispersion of the active precursor over the CNF and thus raises the stability against sintering of the final catalyst, more in particular of a nickel catalyst.

The catalytic material can be applied to the CNF-support in conventional manners, such as incipient wetness or homogeneous deposition precipitation. For metals it is preferred to use homogeneous deposition precipitation, such as described in Synthesis of highly loaded highly dispersed nickel on carbon nanofibers by homogeneous deposition-precipitation Bitter, J. H., M. K. van der Lee, A. G. T. Slotboom, A. J. van Dillen and K. P. de Jong, Cat. Lett. 89 (2003) 139-142.

Suitable reactions both in the liquid and gasphase in which the CNF supported catalysts may be used are the Fischer-Tropsch process, hydrogenation reactions, dehydrogenation reactions, hydro-treating, such as hydro-desulfurisation, methanation reactions, low-temperature oxidation reactions and the like.

EXAMPLE 1

Figure 2:
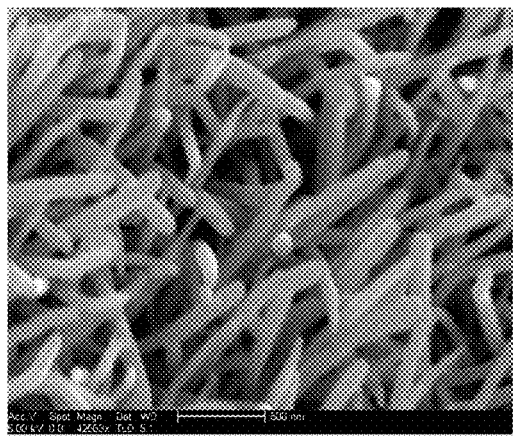
FIG. 2 is a magnification of FIG. 1

MCC spheres were wet impregnated with a solution of ammonium iron citrate in water. Next, the MCC spheres were dried under a vacuum. The impregnated MCC spheres were applied to an iron mesh with the aid of a silicone rubber adhesive layer. The iron mesh was therefore coated with a diluted silicone rubber solution. Before the silicone rubber had solidified, the impregnated MCC spheres were adhered to the silicone rubber adhesive layer. Next, the mesh with the impregnated spheres was brought into an inert stationary nitrogen atmosphere and heated up to 800° C. This resulted in the growth of a dense layer of short, straight carbon nanotubes on the surface of the carbon spheres. In FIG. 1 an SEM photograph of the resulting material is shown. FIG. 2 gives a magnification of FIG. 1.

EXAMPLE 2 (COMPARATIVE)

Figure 3:
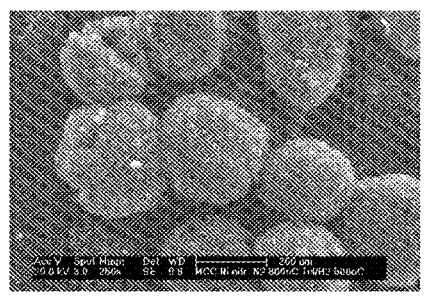
FIG. 3 an EM photograph of the resulting material of example 2.
Figure 4:
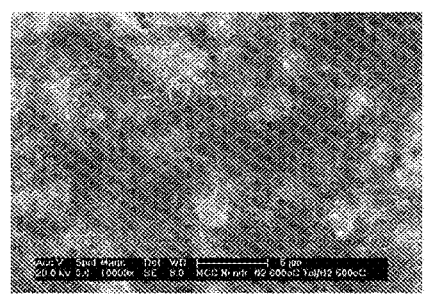
FIG. 4 is a magnification of FIG. 3

MCC spheres were wet impregnated with a solution of nickel nitrate in water. Next, the MCC spheres were dried under a vacuum. The nickel-impregnated spheres were heated up to 800° C. in an inert nitrogen atmosphere (flow) in a fluidised bed. The pyrolysed carbon spheres with small elementary nickel particles were cooled down to 500° C. Next, the gas composition was changed to 90 vol. % $N_2$ and 10 vol. % $H_2$. Toluene was metered for two hours with the aid of a saturator. This resulted in the growth of carbon nanofibers with a fish bone structure on the surface of the carbon spheres. In FIG. 3 an EM photograph of the resulting material is shown. FIG. 4 gives a magnification of FIG. 3.

The invention claimed is:

1. A process for producing carbon nano fibers and/or tubes, the process comprising:
   pyrolyzing a particulate cellulosic and/or carbohydrate substrate that has been impregnated with a metal compound or combination of metal compounds, which are capable of forming carbides, in the presence of volatile silicon compounds in a substantially oxygen free, inert stationary atmosphere, optionally in the presence of a carbon compound.

2. The process according to claim 1, wherein the said substrate is selected from microcrystalline cellulose, sugar, or a mixture of sugar and microcrystalline cellulose, and soy meal.

3. The process according to claim 1, wherein the substrate comprises carbonaceous bodies produced by a hydrothermal treatment of agricultural materials such as sugars, starch, soy meal, (hemi)cellulose; dehydrated products of the above compounds.

4. The process according to claim 1, wherein the substrate is impregnated with a compound of nickel, cobalt, iron and/or molybdenum, followed by drying and pyrolyzing.

5. The process according to claim 1, wherein the said substrate is pyrolysed in the presence of a silicon rubber compound.

6. The process according to claim 1, wherein the said silicon compound is an alkyl siloxane.

7. The process according to claim 6, wherein the said siloxane compound is a trimer of dimethyl siloxane.

8. A process according to claim 7, wherein:
   the pyrolyzing is at a temperature between 500 and 1000° C. for a period between 5 min and 5 hours; and
   the atmosphere is substantially free of carbon compounds.

9. The process according to claim 1, wherein the pyrolyzing is at a temperature between 500 and 1000° C. for a period between 5 min and 5 hours.

10. A process according to claim 9, wherein:
    the substrate comprises carbonaceous bodies produced by a hydrothermal treatment of agricultural materials, such as, sugars, starch, soy meal, (hemi)cellulose, as well as dehydrated products of the above compounds, such as, furfural and 2-hydroxyfurfural;
    the substrate is impregnated with a compound of nickel, cobalt, iron and/or molybdenum, followed by drying and pyrolyzing;
    and the said substrate is pyrolyzed in the presence of a silicon rubber compound.

11. The process according to claim 1, wherein the atmosphere is substantially free of carbon compounds.

12. The process according to claim 1, wherein the atmosphere further contains at least one carbon compound selected from the group consisting of toluene, CO, $CO/H_2$ mixtures, $CH_4$, $C_2H_4$, lower alkanes, alkylenes, alcohols, alkyns, and aromatic compounds.

* * * * *